(12) United States Patent
Walter (10) Patent No.: US 12,430,502 B1
(45) Date of Patent: Sep. 30, 2025

(54) SYSTEMS AND METHODS FOR USING MULTIPLE MACHINE AGENTS TO GENERATE DOCUMENT DRAFTS

(71) Applicant: The Simple Associate, Inc., San Rafael, CA (US)

(72) Inventor: Nathan Walter, San Rafael, CA (US)

(73) Assignee: The Simple Associate, Inc., San Rafael, CA (US)

( * ) Notice: Subject to any disclaimer, the term of this patent is extended or adjusted under 35 U.S.C. 154(b) by 0 days.

(21) Appl. No.: 18/750,977

(22) Filed: Jun. 21, 2024

(51) Int. Cl.
*G06F 40/186* (2020.01)
*G06F 40/174* (2020.01)

(52) U.S. Cl.
CPC .......... *G06F 40/186* (2020.01); *G06F 40/174* (2020.01)

(58) Field of Classification Search
CPC ...... G06F 40/186; G06F 40/174; G06F 40/56; G06Q 10/10; G06Q 50/18
USPC .......................................................... 715/234
See application file for complete search history.

(56) References Cited

U.S. PATENT DOCUMENTS

| | | | |
|---|---|---|---|
| 12,045,579 | B1 | 7/2024 | Walter |
| 2006/0010377 | A1 | 1/2006 | Anecki |
| 2008/0172239 | A1 | 7/2008 | Henderson |
| 2019/0318202 | A1* | 10/2019 | Zhao ..................... G06F 18/214 |
| 2020/0012709 | A1 | 1/2020 | Kogler |
| 2020/0242306 | A1 | 7/2020 | Liu |
| 2022/0014582 | A1 | 1/2022 | Brodkowitz |
| 2022/0270721 | A1 | 8/2022 | Schrempf |
| 2023/0274084 | A1* | 8/2023 | Modani ................. G06F 40/174 715/243 |
| 2023/0368284 | A1* | 11/2023 | Sheikh ................... H04L 9/0618 |
| 2024/0161217 | A1* | 5/2024 | Bleiweiss .............. G06N 20/00 |
| 2024/0273286 | A1* | 8/2024 | Iu ......................... G06N 3/0475 |

OTHER PUBLICATIONS

Subrin & Main, "The Integration of Law and Fact in an Uncharted Parallel Procedural Universe", Notre Dame L. Rev., 79(5), pp. 1981-2024, 2004. (Year: 2004).
Subrin & Main, "The Integration of Law and Fact in an Uncharted Parallel Procedural Universe", Notre Dame L. Rev., 79(5), 1981-2024,2004. (Year: 2004).

* cited by examiner

*Primary Examiner* — Stephen S Hong
*Assistant Examiner* — Broderick C Anderson
(74) *Attorney, Agent, or Firm* — Esplin & Associates, PC (57) ABSTRACT

Systems and methods for using multiple machine agents to generate document drafts. Exemplary implementations may: (a) prompt a generative machine agent to generate an initial document draft; (b) receive the initial document draft from the generative machine agent; (c) prompt a discriminative machine agent to generate a first set of inferences based on the initial document draft; (d) receive the first set of inferences from the discriminative machine agent; (e) prompt the generative machine agent to generate an iterated document draft; (f) receive the iterated document draft from the generative machine agent; (g) prompt the discriminative machine agent to generate an iterated set of inferences; (h) determine whether the iterated set of inferences meets inference criteria; (i) responsive to the iterated set of inferences not meeting inference criteria, loop over operations (e) through (i) to generate and assess a further iterated document draft; and/or other exemplary implementations.

20 Claims, 3 Drawing Sheets

SYSTEMS AND METHODS FOR USING MULTIPLE MACHINE AGENTS TO GENERATE DOCUMENT DRAFTS

FIELD OF THE DISCLOSURE

The present disclosure relates to improvements to existing solutions for document generation, specifically improvements to generate documents used in multi-party proceedings (e.g., legal proceedings) in which the individual parties have competing interests. There are many challenges associated with drafting documents for adversarial legal proceedings, including potential objections from opposing parties. To address this, multiple machine agents may be employed to identify and remedy problematic sections before the proceedings. For example, a generative machine agent may be trained to generate document drafts and/or be paired with a discriminative machine agent trained to identify objectionable points of objection in the generated document drafts. By leveraging multiple machine agents, documents can be produced more efficiently, with a reduced likelihood of objections, and with minimal human intervention.

BACKGROUND

Large language models for text summarization and text generation are known. Generative adversarial networks (GANs) are known.

SUMMARY

One or more aspects of the present disclosure include a system for using multiple machine agents to generate document drafts advocating for a partisan in a multi-party proceeding in which the individual parties have competing interests. The system may include electronic storage, one or more hardware processors configured by machine-readable instructions, and/or other components. Executing the machine-readable instructions may cause the one or more hardware processors to facilitate generating legal document drafts. The machine-readable instructions may include one or more computer program components. The one or more computer program components may include one or more of a drafting component, an objection component, an iterative component, an output component, a model component, and/or other components.

The drafting component may be configured to (a) prompt a generative machine agent to generate an initial document draft for an individual case. In some implementations, prompting the generative machine agent may include providing case content for the individual case as input to the generative machine agent. The case content may include factual information and legal information pertaining to the individual case.

The drafting component may be configured to (b) receive the initial document draft from the generative machine agent.

The objection component may be configured to (c) prompt a discriminative machine agent to generate a first set of inferences based on the initial document draft. In some implementations, prompting the discriminative machine agent may include providing the initial document draft as input to the discriminative machine agent. Individual inferences of the first set of inferences may identify one or more of (i) individual portions of the initial document draft, (ii) separately for the individual portions of the initial document draft that are identified, specific objections likely to be raised by an adverse party to the legal document draft, and/or other information.

The objection component may be configured to (d) receive the first set of inferences from the discriminative machine agent.

The iterative component may be configured to (e) prompt the generative machine agent to generate an iterated document draft that reduces or eliminates the risks of objections identified in the first set of inferences. In some implementations, prompting the generative machine agent may include providing the initial document draft and the first set of inferences as input to the generative machine agent.

The iterative component may be configured to (f) receive the iterated document draft from the generative machine agent.

The iterative component may be configured to (g) prompt the discriminative machine agent to generate an iterated set of inferences based on the iterated document draft and/or other inputs to the discriminative machine agent. In some implementations, prompting the discriminative machine agent may include providing the iterated document draft and/or other information as input to the discriminative machine agent.

The iterative component may be configured to (h) determine whether the iterated set of inferences meets inference criteria.

The iterative component may be configured to (i) responsive to the determination of the iterated set of inferences not meeting the inference criteria, loop over operations (e) through (i) to generate and assess a further iterated document draft.

The output component may be configured to (j) responsive to the determination at operation (h) of the iterated set of inferences meeting the inference criteria, output the iterated document draft, the further iterated document draft generated at the last execution of operation (e), and/or other document drafts.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
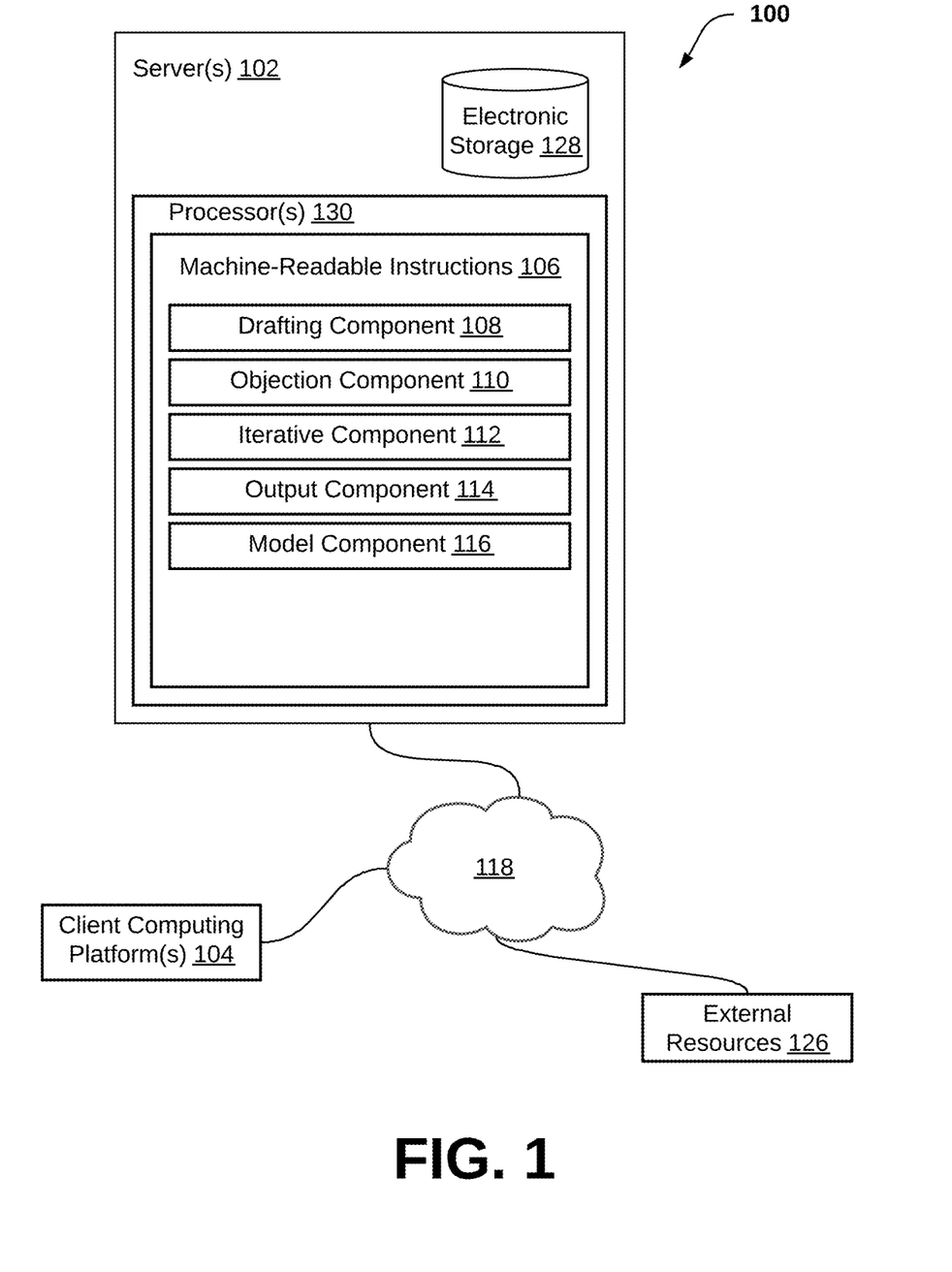
FIG. 1 illustrates a system for using multiple machine agents to generate document drafts advocating for a partisan, in accordance with one or more implementations.

FIG. 1 illustrates a system 100 configured for using multiple machine agents to generate document drafts advocating for a partisan in a multi-party proceeding in which the individual parties have competing interests, in accordance with one or more implementations. In some implementations, system 100 may include one or more server(s) 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Executing the machine-readable instructions 106 may cause server(s) 102 to facilitate generating legal document drafts for individual cases based on case content and exemplary segments of legal documents. Machine-readable instructions 106 may include one or more instruction components. The instruction components may include computer program components. The instruction components may include one or more of drafting component 108, objection component 110, iterative component 112, output component 114, model component 116, and/or other instruction components.

Electronic storage 128 may be configured to store case content for individual cases and/or other information. Case content for individual ones of the cases may include factual information, legal information, exemplary segments of legal documents, and/or other information. The factual information may include information derived from content associated with individual ones of the cases, information acquired from users associated with individual ones of the cases, and/or other types of information. By way of non-limiting illustration, content may include deposition transcripts, deposition recordings, police reports, written witness statements, emails, and/or other types of content. Content may describe facts of the underlying case (e.g., details of incidents associated with individual ones of the cases), procedural details (e.g., document filings, filing dates, court dates, etc.), and/or other information. The legal information may include legal principles, legal theories, case law relevant to individual ones of the cases, and/or information. Relevant case law may be determined based on the factual information included in the case content for individual ones of the cases. By way of non-limiting illustration, relevant case law for an individual case may include one or more cases having similar facts, the same jurisdiction, and/or other similarities to the individual case.

In some implementations, exemplary segments of legal documents may be included in case content for individual ones of the cases. Individual exemplary segments of legal document may be included in case content for one or more individual cases. By way of non-limiting illustration, a first exemplary segment may be included in case content for a first case and a second case. The second case may be separate and distinct from the first case. Individual exemplary segments of legal documents may be defined and/or described by segment information. Segment information for an individual exemplary segment may identify an author that created the individual exemplary segment, a segment type, a document type, a document objective, and/or other characteristics of the individual exemplary segment. Segment information for the individual exemplary segment may be stored in electronic storage 128. In some implementations, exemplary segments of legal documents may include portions of legal documents, entire legal documents, and/or multiple legal documents. The exemplary segments of legal documents may be obtained from a managed document repository (e.g., via external resource(s) 126) and/or other sources. A managed document repository (i.e., case management system) may include a database for storing, organizing, and handling legal documents.

In some implementations, electronic storage 128 may store one or more machine agents. The one or more machine agents may include a generative machine agent, a discriminative machine agent, and/or other machine agents. An individual machine agent may comprise one or more of a machine learning model, a probabilistic model, a decision tree model, and/or other models. By way of non-limiting illustration, the generative machine agent and/or the discriminative machine agent may be a large language model. In some implementations, different models may be utilized at different stages of the system 100. In some implementations, a machine learning model may utilize one or more of an artificial neural network, naïve Bayes classifier algorithm, k-means clustering algorithm, support vector machine algorithm, linear regression, logistic regression, decision tree-based model, random forest, nearest neighbors, matrix factorization (e.g., a class of a class of collaborative filtering algorithms), classifier model, a histogram-based model, and/or other approaches.

Drafting component 108 may be configured to prompt a generative machine agent to generate an initial document draft for an individual case. In some implementations, prompting the generative machine agent may include providing case content for the individual case as input to the generative machine agent. The case content may include factual information and legal information pertaining to the individual case. Factual information may be obtained from content associated with the individual case, user(s) associated with the individual case, and/or other sources. Legal information may be obtained from one or more managed repositories. The one or more managed repositories may be included in electronic storage 128 and/or other components of system 100. Legal information may be obtained from one or more external repositories (e.g., included in external resources 126). In some implementations, drafting component 108 may be configured to obtain legal information from one or more repositories based on obtained factual information and/or other information. By way of non-limiting illustration, content component 108 may be configured to execute a search for "Breach of Contract" within one or more repository based on factual information indicating the individual case is associated with a breach of contract. The case content for the individual case may be obtained from electronic storage 128.

In some implementations, inputs to the generative machine agent may further include exemplary segments of legal documents. The generative machine agent may be configured to generate a document draft for the individual case based on the inputted exemplary segments of legal documents. The generated document draft may be generated in a style and/or format similar to the style and/or format of the inputted exemplary segments of legal documents. The exemplary segments of legal documents may include portions of documents and/or documents pertaining to the individual case and/or other cases. The exemplary segments of legal documents may include human-drafted documents and/or machine generated documents. In some implementations, the inputted exemplary segments of legal documents may be drafted by a single author and/or collection of authors having a specific and distinguishable style. Documents generated based on the inputted exemplary segments of legal documents may appear to have been drafted by the single author and/or collection of authors.

In some implementations, prompting the generative machine agent to generate the initial document draft for the individual case may configure the generative machine agent to generate a document template. The document template may include one or more fields for inserting case-specific information. Prompting may further configure the generative machine agent to, for individual ones of the fields, determine and insert case-specific information for the individual case to generate the initial document draft. The case-specific information may be determined based on the factual information, the legal information, and/or other information pertaining to the individual case. By way of non-limiting illustration, a first document template may include a first field and/or other components. The first field may be associated with a first type of case-specific information (e.g., date of incident). A first document draft may be generated by determining and inserting a first field value (e.g., Jan. 1, 2023) at the first field. Drafting component 108 may be configured to receive the initial document draft from the generative machine agent.

Objection component 110 may be configured to prompt a discriminative machine agent to generate a first set of inferences based on the initial document draft. In some implementations, prompting the discriminative machine agent may include providing the initial document draft as input to the discriminative machine agent. Objection component 110 may be configured to (d) receive the first set of inferences from the discriminative machine agent.

Individual inferences of the first set of inferences may identify one or more of (i) individual portions of the initial document draft, (ii) separately for the individual portions of the initial document draft that are identified, specific objections likely to be raised by an adverse party to the legal document draft, and/or other information. The first set of inference may identify, for individual portions of the initial document draft that are identified, counter-arguments likely to be made by an adverse party to the legal document draft. The counter-arguments may be made during proceedings and/or in responsive documents. Identifications of portions of the initial document draft may specify sections (e.g., headings, subheadings, etc.), line numbers, paragraph numbers, page numbers, and/or other components of the initial document draft. Objections likely to be raised may include irrelevance, overbreadth, undue burden, privilege, confidentiality, duplicity, speculation, scope, ambiguity, public policy, lacking legal basis, and/or other types of objections.

In some implementations, an individual portion of the initial document draft may correspond with two or more types of objections. By way of non-limiting illustration, a first inference may identify a first portion of the initial document draft and a first type of objection likely to be raised by the adverse party in connection with the first portion. A second inference may identify the first portion of the individual document draft and a second type of objection likely to be raised by the adverse party in connection with the first portion. The second type of objection may be separate and distinct from the first type of objection. By way of non-limiting illustration, a first inference may identify a first portion of the individual document draft and a set of objections that may be raised by the adverse party in connection with the first portion.

In some implementations, the discriminative machine agent may be configured to determine a risk of objection associated with individual portions of the initial document draft and/or another inputted document draft. The risk of objection may be a score, percentage, and/or other indicator of likelihood of an objection being raised in connection with the individual portions. The discriminative machine agent may be further configured to generate an inference for the individual portion responsive to the risk of objection meeting or exceeding a threshold. In some implementations, prompting the discriminative machine agent to generate a first set of inferences based on the initial document draft may include providing instructions to the discriminative machine agent specifying the threshold. The threshold may be selected and/or provided by the user. In some implementations, specific types of objections identified by the discriminative machine agent may automatically trigger an inference. The specific types of objections may be selected and/or provided by the user.

Iterative component 112 may be configured to (e) prompt the generative machine agent to generate an iterated document draft that reduces or eliminates the risks of objections identified in the first set of inferences. In some implementations, prompting the generative machine agent may include providing the initial document draft and the first set of inferences as input to the generative machine agent. Iterative component 112 may be configured to (f) receive the iterated document draft from the generative machine agent. Iterative component 112 may be configured to (g) prompt the discriminative machine agent to generate an iterated set of inferences based on the iterated document draft and/or other inputs to the discriminative machine agent. In some implementations, prompting the discriminative machine agent may include providing the iterated document draft and/or other information as input to the discriminative machine agent. Iterative component 112 may be configured to (h) determine whether the iterated set of inferences meets inference criteria.

Inference criteria may include one or more thresholds, requirements, and/or conditions to be satisfied by the iterated set of inferences generated by execution of operation (g). In some implementations, inference criteria may specify a threshold number of inferences and iterated sets of inferences including a number of inferences above the threshold number may not meet inference criteria. In some implementations, inference criteria may specify a threshold number of a particular type of objections specified by the inferences. For example, an acceptable number of a first type of objection may be different from an acceptable number of a second type of objection. In some implementations, inference criteria may depend on the type of document draft generated by the generative machine agent. By way of non-limiting illustration, inference criteria for a complaint may be different from inference criteria for a discovery request. In some implementations, inference criteria may be selected by the user via client computing platform 104.

Iterative component 112 may be configured to, responsive to the determination of the iterated set of inferences not meeting the inference criteria, loop over the operations (e) through (h) to generate and assess a further iterated document draft. Output component 114 may be configured to output the iterated document draft, the further iterated document draft generated at the last execution of operation (e), and/or other document drafts responsive to the determination of the iterated set of inferences meeting the inference criteria.

In some implementations, iterative component 112 may be configured to loop over operations (e) through (h) for a specified number of iterations. Output component 114 may be configured to determine, of the iterated document drafts generated by the specified number of executions of operation (e), a final document draft to output to the user. Output component 114 may be configured to determine the final document draft by comparing the sets of inferences generated based on the document drafts generated by the specified number of executions of operation (e). By way of non-limiting illustration, the document draft associated with the iterated set of inferences having the fewest number of inferences may be determined to be the final document draft.

In some implementations, iterative component 112 may be configured to, for individual ones of the iterated sets of inferences generated by executions of operation (g), determine a risk score for the iterated sets of inferences. The risk score may be determined based on the inferences included in the individual iterated sets of inferences and/or other information. The risk score may be based on one or more of the number of inferences, the types of objections, and/or other information pertaining to the individual iterated sets of inferences. For example, a higher number of inferences may be associated with a higher risk score. Different types of objections may have different weights when determining the risk score for an iterated set of inferences. A higher number of a specific type of objection may be associated with a higher risk score. In some implementations, the risk score may be a numeric value, a percentage, a textual label (e.g., low risk, moderate risk, high risk), and/or other methods of scoring. In some implementations, the iterated document drafts generated by multiple executions of operation (e) may be ranked based on the risk scores for the corresponding iterated sets of inferences. By way of non-limiting illustration, the iterated document drafts and the initial document draft may be ranked based on risk scores for the corresponding sets of inferences.

In some implementations, inference criteria may specify a particular risk score. Iterative component 112 may be configured to loop over operations (e) through (h), until the determination at operation (h) that an iterated set of inferences meets inference criteria. The iterated set of inferences may meet inference criteria responsive to a determination that a risk score for the iterated set of inferences generated at the last execution of operation (g) is the same as or lower than the particular risk score specified by the inference criteria.

In some implementations, iterative component 112 may be configured, further responsive to the determination at operation (h) of the iterated set of inferences meeting the criteria, output a selected document draft. The selected document draft may be selected by the user of the iterated documents drafts generated by executions of operation (e) and/or the initial document draft. Iterative component 112 may be configured to identify the selected document draft of the iterated document drafts generated by executions of operation (e). The selected document draft may be selected based on selection criteria. The selection criteria may be selected by the user, via user input, and the selection criteria may specify one or more a threshold number of inferences, a type of objection, and/or a number of a type of objection.

In some implementations, iterative component 112 may be configured to identify the selected document draft after a specified number of loops over operations (e) through (g).

In some implementations, output component 114 may be configured to provide the selected document draft and the iterated set of inferences generated based on the selected document draft. Output component 114 may be configured to effectuate presentation of a user interface (e.g., via client computing platform 104) that displays the selected document draft (i.e., one of the iterated document drafts) with the set of inferences generated based on the selected document drafts. By way of non-limiting illustration, the selected document draft may be displayed, and portions of the selection document draft identified by the individual inferences in the set of inferences may be displayed with selectable icons, flags, identifiers, and/or other user interface elements. Selection of the selectable user interface elements may effectuate an expanded display of the inference identifying the portion of the selected document draft. Expanded display of the inference may include descriptions of the type of objection(s) and/or other information corresponding to the portion of the selected document draft.

Model component 116 may be configured to train a generative adversarial network (GAN) comprising the generative machine agent, the discriminative machine agent, and/or other machine agents. The GAN may be stored in electronic storage 128 and/or other storage locations. Training the GAN may include training the generative machine agent and/or a model underlying the generative machine agent using case content for individual cases and corresponding documents for the individual cases draft based on the case content. Training the GAN may further include training the discriminative machine agent and/or a model underlying the discriminative machine agent using objection history associated with individual ones of the documents and/or documents identifying counter-arguments in response to the individual ones of the documents (e.g., documents drafted and/or otherwise prepared in response to the individual ones of the documents). Objection history for a given document may specify (i) individual portions of the given document, (ii) for the specified individual portions of the given document, specific objections raised by an adverse party to the legal document draft, and/or other information. By way of non-limiting illustration, objection history may include court transcripts, audio recordings, and/or other information.

In some implementations, the generative machine agent and the discriminative machine agent may be alternately trained in a training process. For example, the weight values and parameters of the generative machine agent may remain unchanged while the updating the weight values of the discriminative machine agent are updated, and vice versa. In some implementations, outputs generated by the discriminative machine agent may be used to update the weight values and parameters of the generative machine agent (e.g., via back-propagation update).

Training of one or more models underlying the generative machine agent and/or the discriminative machine agent may be based on one or more of deep learning, supervised learning, semi-supervised learning, unsupervised learning, reinforcement learning, low-code techniques, and/or other techniques.

In supervised learning, the model may be provided with a known training dataset that includes desired inputs (e.g., case content) and outputs (e.g., document drafts), and the model may be configured to find a method to determine how to arrive at those outputs based on the inputs. By way of non-limiting illustration, in order to output document drafts based on case content, a model may be trained with training input information comprising case content for individual cases, and training output information comprising documents actually drafted based on the corresponding case content. In order to output portions of documents with a risk of objectionability, a model may be training with training input information comprising documents, and training output information comprising objection history detailing objections raised to the documents (e.g., court transcripts). The model may identify patterns in information, learn from observations, and/or make predictions. The model may make predictions and may be corrected by an operator—this process may continue until the model achieves a desired level of accuracy/performance. By way of non-limiting illustration, the process may continue until the discriminative machine agent is capable of detecting a threshold number of objections found in the training documents. Supervised learning may utilize approaches including one or more of classification, regression, forecasting, and/or other approaches.

Semi-supervised learning may be similar to supervised learning, but instead uses both labelled and unlabeled data. Labelled data may comprise information that has meaningful tags so that the model can understand the data, while unlabeled data may lack that information. By using this combination, the machine learning model may learn to label unlabeled data.

For unsupervised learning, the machine learning model may study information to identify patterns. There may be no answer key or human operator to provide instruction. Instead, the model may determine the correlations and relationships by analyzing available information. In an unsupervised learning process, the machine learning model may be left to interpret large information sets and address that information accordingly. The model may try to organize that information in some way to describe its structure. This might mean grouping the information into clusters or arranging it in a way that looks more organized. Unsupervised learning may use techniques such as clustering and/or dimension reduction.

Reinforcement learning may focus on regimented learning processes, where the machine learning model may be provided with a set of actions, parameters, and/or end values (e.g., the desired outputs). By defining the rules, the machine learning model then tries to explore different options and possibilities, monitoring and evaluating each result to determine which one is optimal to generate correspondences. Reinforcement learning teaches the model trial and error. The model may learn from past experiences and adapt its approach in response to the situation to achieve the best possible result.

Figure 3:
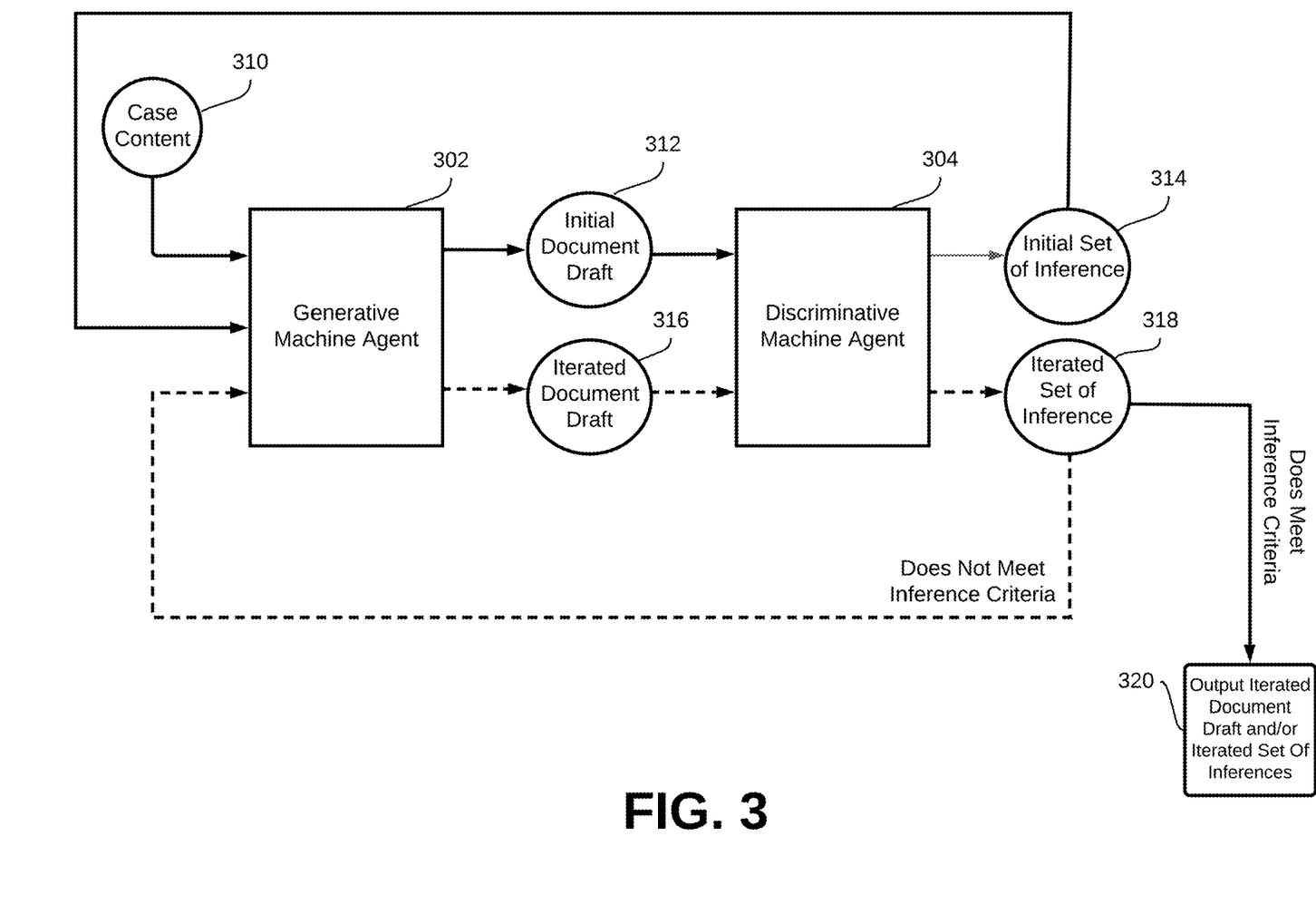
FIG. 3 illustrates an exemplary implementation of a system for using multiple machine agents to generate document drafts advocating for a partisan, in accordance with one or more implementations.

FIG. 3 illustrates an exemplary implementation of a system for using multiple machine agents to generate document drafts advocating for a partisan (the same as or similar to system 100 depicted in FIG. 1), in accordance with one or more implementations. For example, case content 310 and/or other information may be provided as input to generative machine agent 302. Generative machine agent 302 may be prompted by a drafting component (the same as or similar to drafting component 108) to generate, based on the inputted case content 310, initial document draft 312. Initial document draft 304 may be automatically provided as input to discriminative machine agent 304. Discriminative machine agent 304 may be prompted by objection component (the same as or similar to objection component 110) to generated, based on the inputted initial document draft 312, initial set of inferences 314. In some implementations, initial document draft 312 and/or initial set of inferences 314 may be outputted to a user. In some implementations, initial set of inferences 314 may be provided as input, in addition to one or more of case content 310 and initial document draft 312, to generative machine agent 302. Generative machine agent 302 may be configured to, based on initial set of inferences 314, generate iterated document draft 316. Iterated document draft 316 and/or other information may be provided as input to discriminative machine agent 304. Discriminative machine agent 304 may be configured to, based on the inputted iterated document draft, generate iterated set of inferences 318. Responsive to iterated set of inferences 318 not meeting inference criteria, the loop of operations represented by the dashed arrows may be executed to generate a further iterated document draft and a further iterated set of inferences. In some implementations, the loop of operations represented by the dashed arrows may be executed until a set of inferences is generated by discriminative machine agent 304 that meets inference criteria, for a set number of iterations, and/or until other criteria is met. Responsive to iterated set of inferences 318 meeting inference criteria, operation 320 may be performed. Operation 320 may include outputting one or more of the iterated document draft, the iterated set of inferences, and/or other information to a user. In some implementations, the iterated document draft may be the document draft last generated by generative machine agent 302. Operation 320 may be performed by an output component that is the same as or similar to output component 114. The iterated set of inferences may be the set of inferences last generated by discriminative machine agent 304.

In some implementations, server(s) 102, client computing platform(s) 104, and/or external resources 126 may be operatively linked via one or more electronic communication links. For example, such electronic communication links may be established, at least in part, via a network 118 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user corresponding to the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 118 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or 116, and/or other components. Processor(s) 130 may be configured to execute components 108, 110, 112, 114, and/or 116, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 130 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 130 may be configured to execute one or more additional components that may perform some or all of the functionality attributed below to one of components 108, 110, 112, 114, and/or 116.

Figure 2:
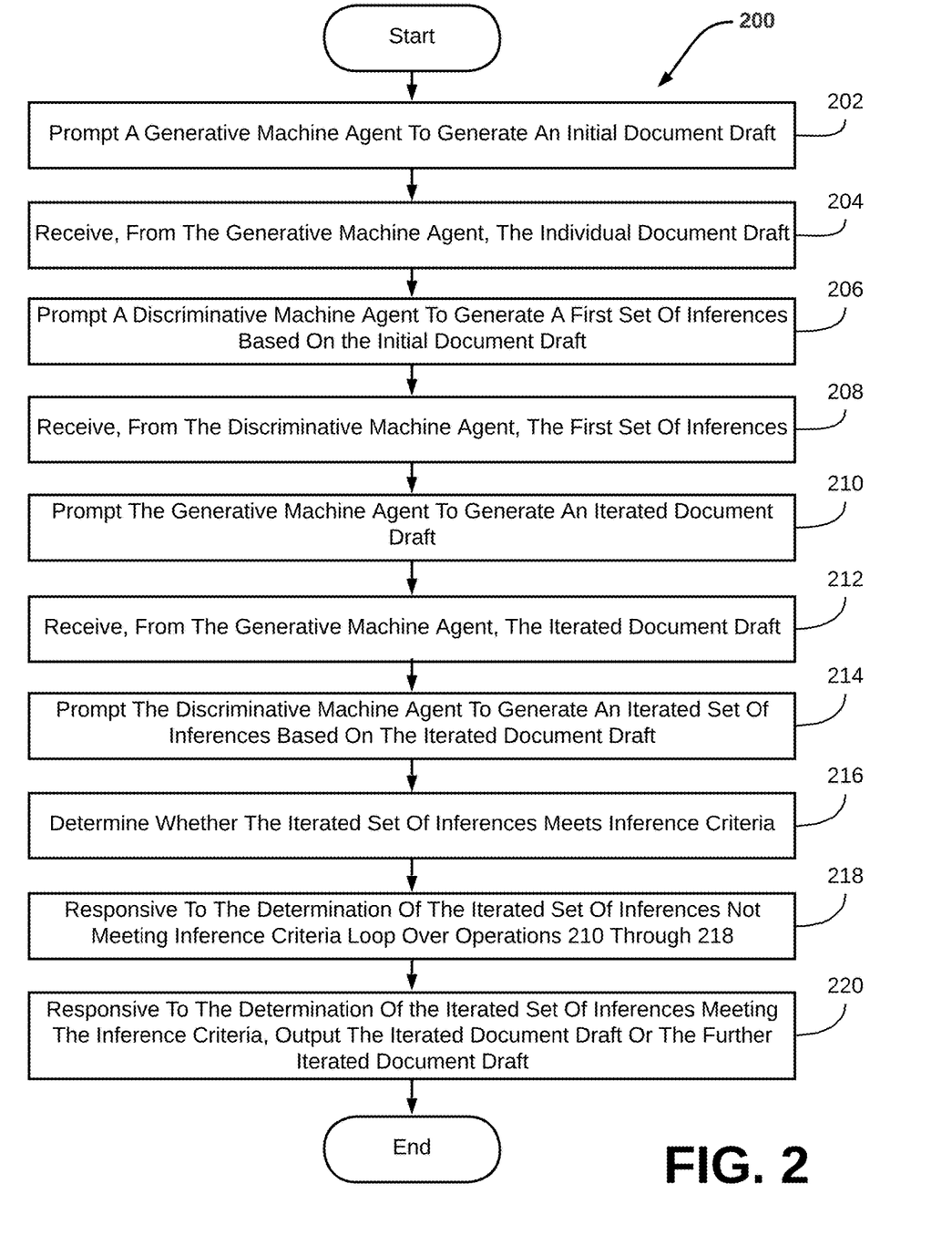
FIG. 2 illustrates a method for using multiple machine agents to generate document drafts advocating for a partisan, in accordance with one or more implementations.

FIG. 2 illustrates a method 200 for using multiple machine agents to generate document drafts advocating for a partisan in a multi-party proceeding in which the individual parties have competing interests, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include prompting a generative machine agent to generate an initial document draft for an individual case. In some implementations, prompting the generative machine agent may include providing case content for the individual case as input to the generative machine agent. The case content may include factual information and legal information pertaining to the individual case. Operation 202 may be performed by one or more hardware processors configured by machine-readable instructions including a component that is the same as or similar to drafting component 108, in accordance with one or more implementations.

An operation 204 may include receiving the initial document draft from the generative machine agent. Operation 204 may be performed by one or more hardware processors configured by machine-readable instructions including a component that is the same as or similar to drafting component 108, in accordance with one or more implementations.

An operation 206 may include prompting a discriminative machine agent to generate a first set of inferences based on the initial document draft. In some implementations, prompting the discriminative machine agent may include providing the initial document draft as input to the discriminative machine agent. Individual inferences of the first set of inferences may identify one or more of (i) individual portions of the initial document draft, (ii) separately for the individual portions of the initial document draft that are identified, specific objections likely to be raised by an adverse party to the legal document draft, and/or other information. Operation 206 may be performed by one or more hardware processors configured by machine-readable instructions including a component that is the same as or similar to objection component 110, in accordance with one or more implementations.

An operation 208 may include receiving the first set of inferences from the discriminative machine agent. Operation 208 may be performed by one or more hardware processors configured by machine-readable instructions including a component that is the same as or similar to objection component 110, in accordance with one or more implementations.

An operation 210 may include prompting the generative machine agent to generate an iterated document draft that reduces or eliminates the risks of objections identified in the first set of inferences. In some implementations, prompting the generative machine agent may include providing the initial document draft and the first set of inferences as input to the generative machine agent. Operation 210 may be performed by one or more hardware processors configured by machine-readable instructions including a component that is the same as or similar to iterative component 112, in accordance with one or more implementations.

An operation 212 may include receiving the iterated document draft from the generative machine agent. Operation 212 may be performed by one or more hardware processors configured by machine-readable instructions including a component that is the same as or similar to iterative component 112, in accordance with one or more implementations.

An operation 214 may include prompting the discriminative machine agent to generate an iterated set of inferences based on the iterated document draft and/or other inputs to the discriminative machine agent. In some implementations, prompting the discriminative machine agent may include providing the iterated document draft and/or other information as input to the discriminative machine agent. Operation 214 may be performed by one or more hardware processors configured by machine-readable instructions including a component that is the same as or similar to iterative component 112, in accordance with one or more implementations.

An operation 216 may include determining whether the iterated set of inferences meets inference criteria. Operation 216 may be performed by one or more hardware processors configured by machine-readable instructions including a component that is the same as or similar to iterative component 112, in accordance with one or more implementations.

An operation 218 may include, responsive to the determination of the iterated set of inferences not meeting the inference criteria, loop over operation 210 through operation 218 to generate and assess a further iterated document draft. Operation 218 may be performed by one or more hardware processors configured by machine-readable instructions including a component that is the same as or similar to iterative component 112, in accordance with one or more implementations.

An operation 220 may include outputting the iterated document draft, the further iterated document draft generated at the last execution of operation 210, and/or other document drafts, responsive to the determination at operation 216 of the iterated set of inferences meeting the inference criteria. Operation 220 may be performed by one or more hardware processors configured by machine-readable instructions including a component that is the same as or similar to output component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to use multiple machine agents to generate document drafts advocating for a partisan in a multi-party proceeding in which the individual parties have competing interests, the system comprising:

one or more physical processors configured by machine-readable instructions to:

(a) prompt a generative machine agent to generate an initial document draft for an individual case, such prompting including providing case content for the individual case as input to the generative machine agent, the case content including factual information and legal information pertaining to the individual case;

(b) receive, from the generative machine agent, the initial document draft;

(c) prompt a discriminative machine agent to generate a first set of inferences based on the initial document draft, such prompting including providing the initial document draft as input to the discriminative machine agent, individual inferences of the first set of inferences identifying (i) individual portions of the initial document draft and (ii) separately for the individual portions of the initial document draft that are identified, specific objections likely to be raised by an adverse party to the initial document draft;

(d) receive, from the discriminative machine agent, the first set of inferences;

(e) provide the initial document draft and the first set of inferences that identify the specific objections likely to be raised by the adverse party to the individual portions of the initial document draft to the generative machine agent and prompt the generative machine agent to generate an iterated document draft based on the initial document draft and the first set of inferences, the prompt including instructions to reduce or eliminate the risks of the specific objections identified in the first set of inferences in the iterated document draft;

(f) receive, from the generative machine agent, the iterated document draft;

(g) prompt the discriminative machine agent to generate an iterated set of inferences based on the iterated document draft, such prompting including providing the iterated document draft as input to the discriminative machine agent;

(h) determine whether the iterated set of inferences meets inference criteria;

(i) responsive to the determination of the iterated set of inferences not meeting the inference criteria, loop over operations (e) through (i) substituting the iterated document draft for the initial document draft and substituting the iterated set of inferences for the first set of inferences to generate and assess a further iterated document draft; and (j) responsive to the determination at operation (h) of the iterated set of inferences meeting the inference criteria, output the iterated document draft or the further iterated document draft generated at the last execution of operation (e).

2. The system of claim 1, wherein prompting the generative machine agent to generate the initial document draft for the individual case configures the generative machine agent to:
   generate a document template including one or more fields for inserting case-specific information;
   for individual ones of the fields, determine and insert case-specific information for the individual case to generate the initial document draft, wherein the case-specific information is determined based on the factual information and the legal information pertaining to the individual case.

3. The system of claim 1, wherein the one or more physical processors are further configured to:
   train the generative machine agent using case content for individual cases and corresponding documents for the individual cases drafted based on the case content; and
   output the trained generative machine agent.

4. The system of claim 1, wherein the one or more physical processors are further configured to:
   train the discriminative machine agent using documents and objection history associated with individual ones of the documents, wherein objection history for a given document specifies (i) individual portions of the given document and (ii) for the specified individual portions of the given document, specific objections raised by an adverse party to the given document; and
   output the trained discriminative machine agent.

5. The system of claim 1, wherein the one or more physical processors are configured to, further responsive to the determination at operation (h) of the iterated set of inferences meeting the criteria:
   output, of the iterated document drafts generated by operation (e), a selected document draft that meets selection criteria.

6. The system of claim 5, wherein a determination that the selected document draft meets selection criteria is based on the set of inferences generated, by the discriminative machine agent, based on the selected document draft.

7. The system of claim 5, wherein selection criteria is selected by the user, via user input, and wherein the selection criteria specifies one or more a threshold number of inferences, a type of objection, and/or a number of a type of objection.

8. The system of claim 1, wherein inference criteria is selected by the user, via user input, and wherein inference criteria specifies one or more a threshold number of inferences, a type of objection, and/or a number of a type of objection.

9. The system of claim 1, wherein the one or more physical processors are further configured to:
   for individual sets of inferences generated by the discriminative machine agent, generate a risk score based on one or more of the number of inferences included in the individual sets of inferences and the type of objections identified by individual inferences of the individual sets of inferences.

10. The system of claim 1, wherein the generative machine agent is a large language model stored in electronic storage.

11. A method for using multiple machine agents to generate document drafts advocating for a partisan in a multi-party proceeding in which the individual parties have competing interests, the method comprising:
   (a) prompting a generative machine agent to generate an initial document draft for an individual case, such prompting including providing case content for the individual case as input to the generative machine agent, the case content including factual information and legal information pertaining to the individual case;
   (b) receiving, from the generative machine agent, the initial document draft;
   (c) prompting a discriminative machine agent to generate a first set of inferences based on the initial document draft, such prompting including providing the initial document draft as input to the discriminative machine agent, individual inferences of the first set of inferences identifying (i) individual portions of the initial document draft and (ii) separately for the individual portions of the initial document draft that are identified, specific objections likely to be raised by an adverse party to the initial document draft;
   (d) receiving, from the discriminative machine agent, the first set of inferences;
   (e) providing the initial document draft and the first set of inferences that identify the specific objections likely to be raised by the adverse party to the individual portions of the initial document draft to the generative machine agent and prompting the generative machine agent to generate an iterated document draft based on the initial document draft and the first set of inferences, the prompt including instructions to reduce or eliminate the risks of the specific objections identified in the first set of inferences in the iterated document draft;
   (f) receiving, from the generative machine agent, the iterated document draft;
   (g) prompting the discriminative machine agent to generate an iterated set of inferences based on the iterated document draft, such prompting including providing the iterated document draft as input to the discriminative machine agent;
   (h) determining whether the iterated set of inferences meets inference criteria;
   (i) responsive to the determination of the iterated set of inferences not meeting the inference criteria, looping over operations (e) through (i) substituting the iterated document draft for the initial document draft and substituting the iterated set of inferences for the first set of inferences to generate and assess a further iterated document draft; and
   (j) responsive to the determination at operation (h) of the iterated set of inferences meeting the inference criteria, outputting the iterated document draft or the further iterated document draft generated at the last execution of operation (e).

12. The method of claim 11, wherein prompting the generative machine agent to generate the initial document draft for the individual case configures the generative machine agent to:
   generate a document template including one or more fields for inserting case-specific information;
   for individual ones of the fields, determine and insert case-specific information for the individual case to generate the initial document draft, wherein the case-specific information is determined based on the factual information and the legal information pertaining to the individual case.

13. The method of claim 11, wherein the method further comprises:
   training the generative machine agent using case content for individual cases and corresponding documents for the individual cases drafted based on the case content; and
   outputting the trained generative machine agent.

14. The method of claim 11, wherein the method further comprises:
   training the discriminative machine agent using documents and objection history associated with individual ones of the documents, wherein objection history for a given document specifies (i) individual portions of the given document and (ii) for the specified individual portions of the given document, specific objections raised by an adverse party to the given document; and
   outputting the trained discriminative machine agent.

15. The method of claim 11, wherein the method further comprises, further responsive to the determination at operation (h) of the iterated set of inferences meeting the criteria:
   outputting, of the iterated document drafts generated by operation (e), a selected document draft that meets selection criteria.

16. The method of claim 15, wherein a determination that the selected document draft meets selection criteria is based on the set of inferences generated, by the discriminative machine agent, based on the selected document draft.

17. The method of claim 15, wherein selection criteria is selected by the user, via user input, and wherein the selection criteria specifies one or more a threshold number of inferences, a type of objection, and/or a number of a type of objection.

18. The method of claim 11, wherein inference criteria is selected by the user, via user input, and wherein inference criteria specifies one or more a threshold number of inferences, a type of objection, and/or a number of a type of objection.

19. The method of claim 11, wherein the method further comprises:
   for individual sets of inferences generated by the discriminative machine agent, generating a risk score based on one or more of the number of inferences included in the individual sets of inferences and the type of objections identified by individual inferences of the individual sets of inferences.

20. The method of claim 11, wherein the generative machine agent is a large language model stored in electronic storage.

* * * * *